US010155624B1

(12) United States Patent
Nix

(10) Patent No.: US 10,155,624 B1
(45) Date of Patent: Dec. 18, 2018

(54) MAGNETIC SEAL FOR CONVEYOR BELT ASSEMBLY

(71) Applicant: Joy MM Delaware, Inc., Wilmington, DE (US)

(72) Inventor: Stevie K. Nix, Winfield, AL (US)

(73) Assignee: Joy Global Underground Mining LLC, Warrendale, PA (US)

( * ) Notice: Subject to any disclaimer, the term of this patent is extended or adjusted under 35 U.S.C. 154(b) by 0 days.

(21) Appl. No.: 15/678,521

(22) Filed: Aug. 16, 2017

(51) Int. Cl.
*B65G 15/08* (2006.01)
*B65G 15/16* (2006.01)
*B65G 23/18* (2006.01)

(52) U.S. Cl.
CPC .............. *B65G 15/08* (2013.01); *B65G 15/16* (2013.01); *B65G 23/18* (2013.01); *B65G 2201/045* (2013.01)

(58) Field of Classification Search
CPC ................................ B65G 15/08; B65G 15/18

USPC ............................................ 198/626.1, 626.2
See application file for complete search history.

(56) References Cited

U.S. PATENT DOCUMENTS

| 6,510,941 B2 | 1/2003 | Schermutzki et al. |
| 8,919,543 B2 | 12/2014 | Jorgensen et al. |
| 9,004,266 B2 | 4/2015 | Neuhaeuser |
| 2016/0221758 A1 | 8/2016 | Bogle et al. |

OTHER PUBLICATIONS

CKIT, "Sandwich Conveyors Design Guidelines and Standards," www.ckit.co.za/secure/conveyor/sandwich/sandwich_design_guidelines.htm, retrieved on Oct. 19, 2016.

*Primary Examiner* — William R Harp
(74) *Attorney, Agent, or Firm* — Michael Best & Friedrich LLP

(57) ABSTRACT

A conveyor assembly includes a first conveyor belt that defines a centerline extending in a conveying direction and a second conveyor belt that at least partially overlaps the first conveyor belt in the conveying direction. The conveyor assembly further includes a magnetic coupling that magnetically couples the first conveyor belt to the second conveyor belt.

18 Claims, 6 Drawing Sheets

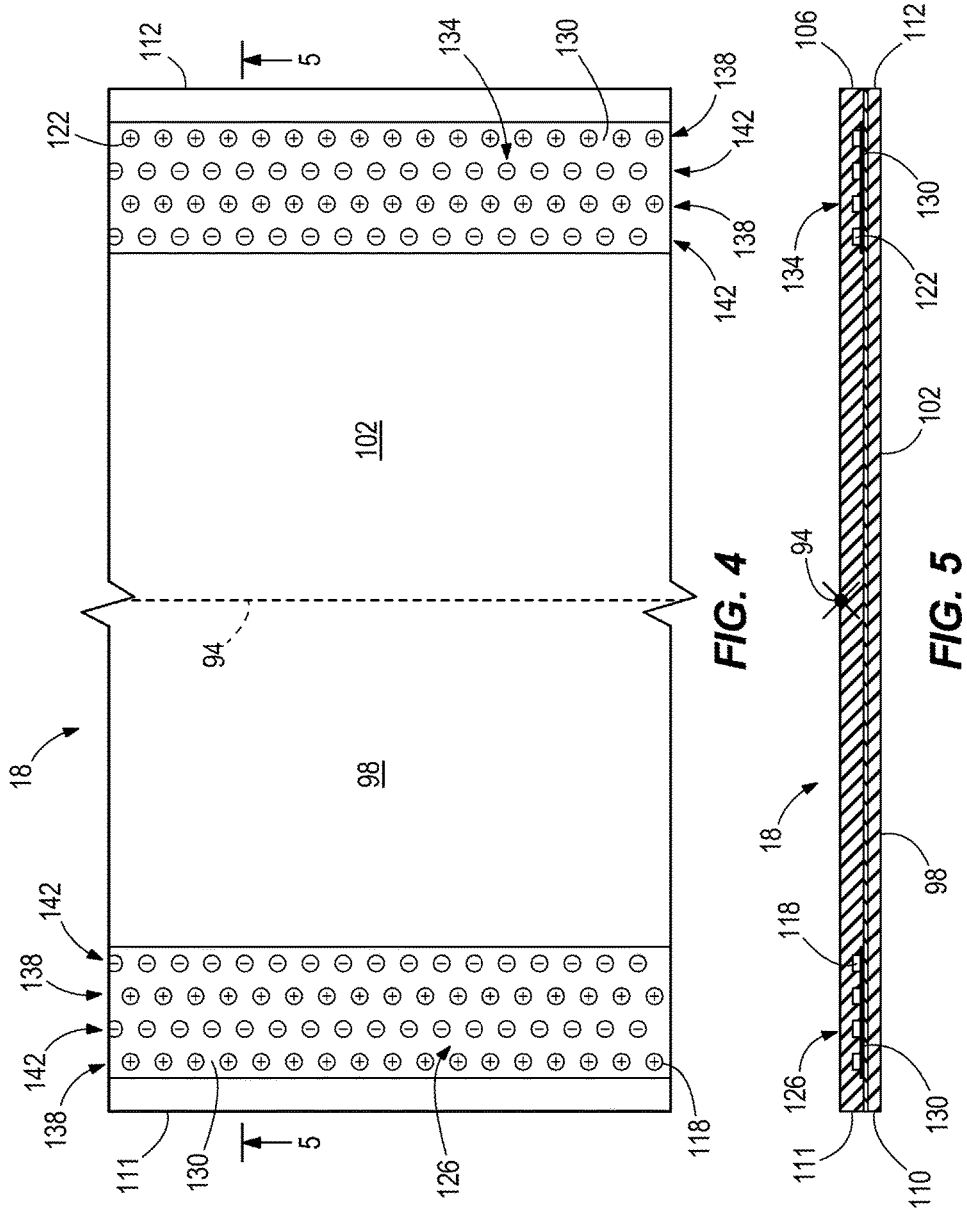

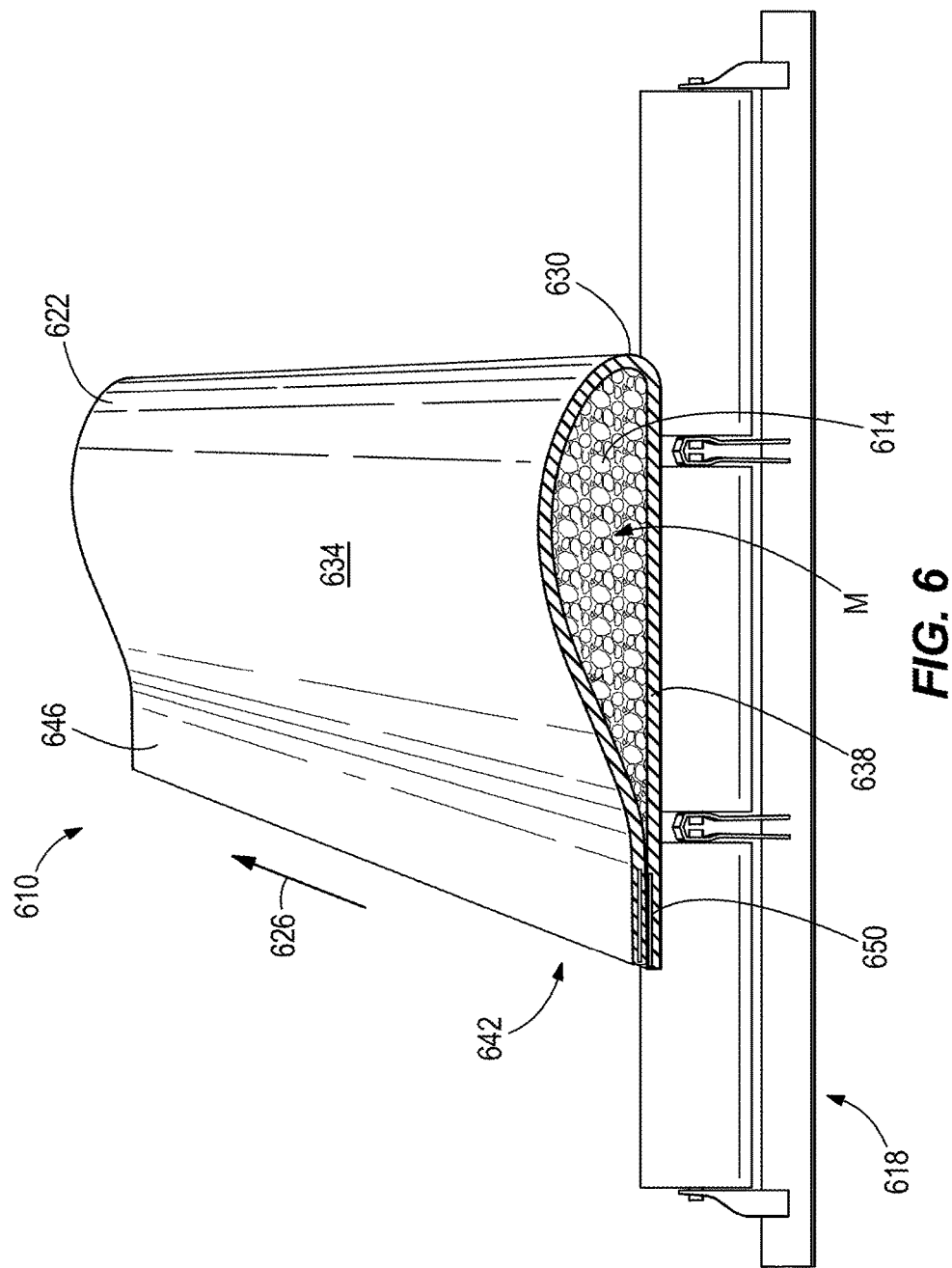

MAGNETIC SEAL FOR CONVEYOR BELT ASSEMBLY

FIELD OF THE INVENTION

The present invention relates to industrial equipment, in particular, a conveyor belt assembly for conveying material.

BACKGROUND OF THE INVENTION

Conveyors are generally used in industrial, food, bulk material handling applications (e.g., mining, industrial processing, etc.) to transport a material (e.g., a mined material, processed material, etc.). Typically, the material is transported on top of a conveyor belt from one location to another. However, the material may fall off the conveyor belt before reaching the desired location.

SUMMARY

In one embodiment, the invention provides a belt conveyor assembly including a first conveyor belt that defines a centerline extending in a conveying direction and a second conveyor belt that at least partially overlaps the first conveyor belt along the centerline. The conveyor assembly further includes a magnetic coupling that magnetically couples the edges of the first conveyor belt to the edges of the second conveyor belt.

In another embodiment, the invention provides a conveyor assembly including a conveyor belt that defines a centerline extending in a conveying direction and operable to move in the conveying direction, and a magnetic element coupled to the conveyor belt and spaced laterally form the centerline. The magnetic element travels with the conveyor belt in the conveying direction.

In a further embodiment, the invention provides a conveyor assembly including a conveyor belt that defines a centerline extending in a conveying direction. The conveyor also includes a first magnetic element coupled to the conveyor belt and spaced laterally from the centerline and a second magnetic element coupled to the conveyor belt and spaced laterally from the centerline.

Other aspects of the invention will become apparent by consideration of the detailed description and accompanying drawings.

BRIEF DESCRIPTION OF THE DRAWINGS

FIG. 4 is a partial top view of a conveyor belt of the conveyor assembly of FIG. 1.

FIG. 5 is a cross-sectional view of the conveyor belt of FIG. 4.

FIG. 6 is a front cross-sectional view of a conveyor assembly according to another embodiment of this invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. It should be understood that the description of specific embodiments is not intended to limit the disclosure from covering all modifications, equivalents, and alternatives falling within the spirit and scope of the disclosure. Also, it is to be understood that the phraseology used herein for the purpose of description and should not be regarded as limiting.

DETAILED DESCRIPTION

Figure 1:
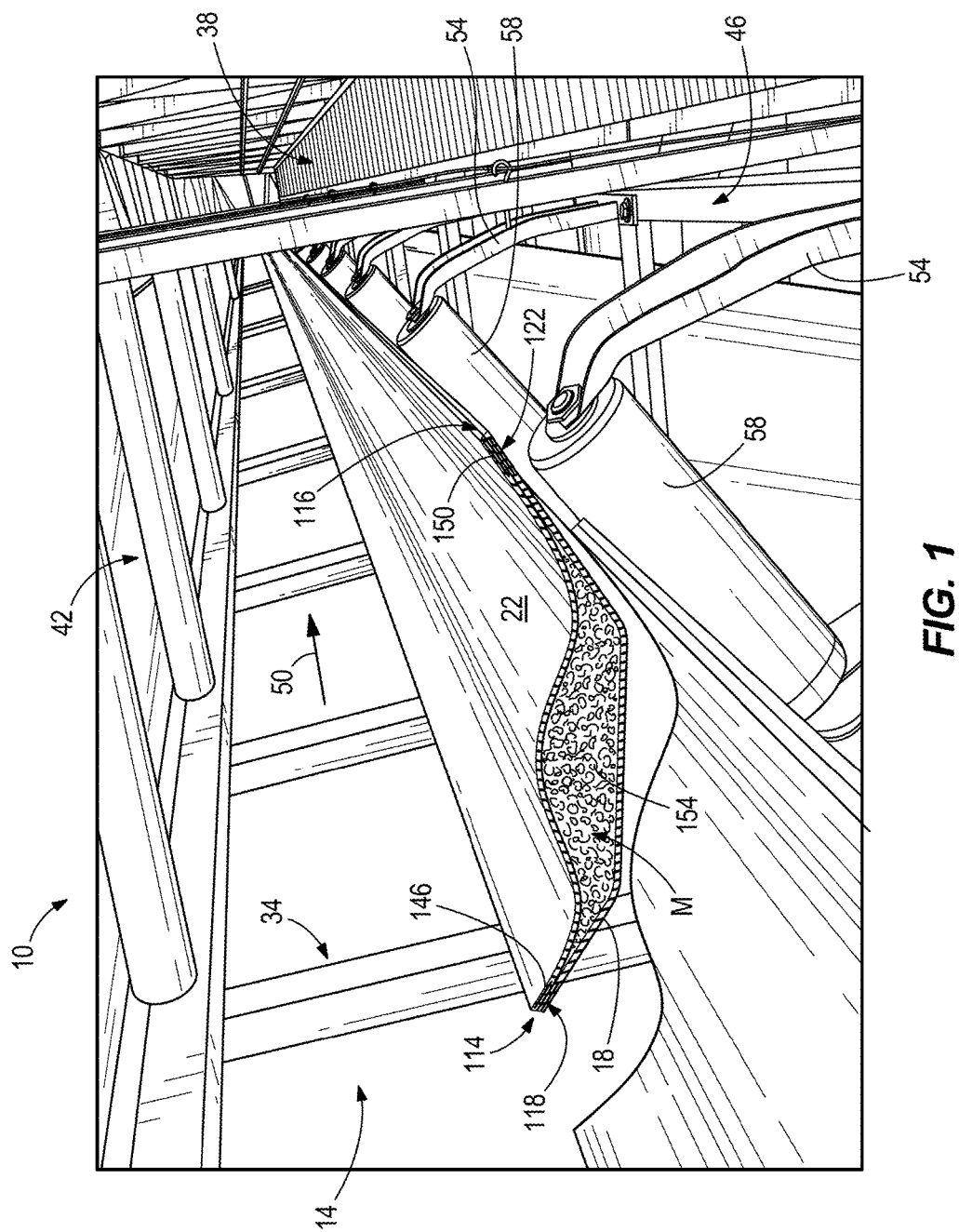
FIG. 1 is a perspective view of a belt conveyor assembly according to an embodiment of the invention, showing a partial cross-section.
Figure 2:
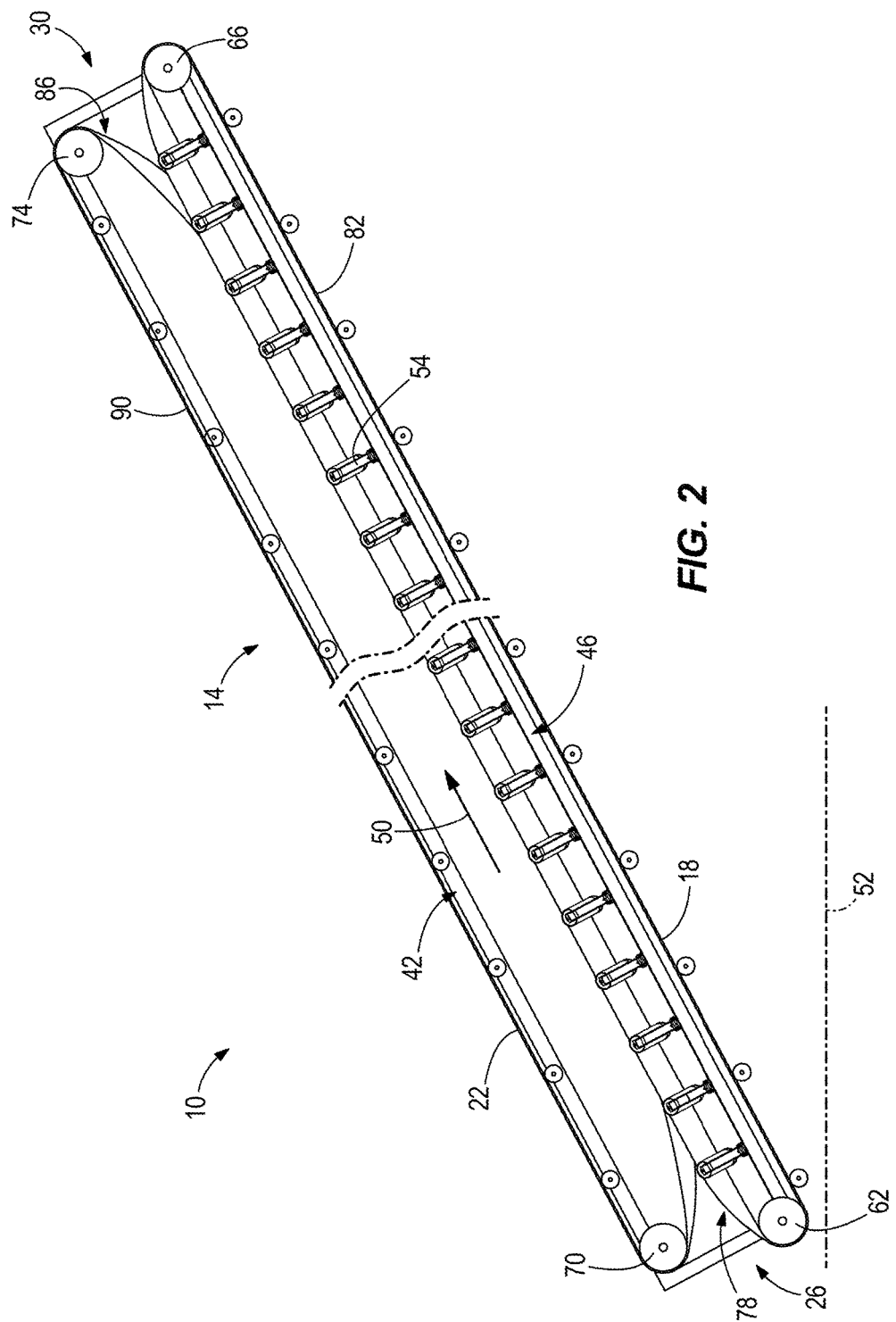
FIG. 2 is a side view of the belt conveyor assembly of FIG. 1

With reference to FIGS. 1-5, a conveyor assembly 10 is illustrated according to an embodiment of the invention. The conveyor assembly 10 includes a frame 14, a first conveyor belt 18, and a second conveyor belt 22. The frame 14 has a first end (i.e., an upstream end 26), a second end (i.e., a downstream end 30), a first lateral side 34, a second lateral side 38, a top side 42 and a bottom side 46. A material flow direction 50 (i.e., a conveying direction) is generally defined from the upstream end 26 of the frame 14 to the downstream end 30 of the frame 14. With reference to FIG. 2, the conveyor assembly 10 is operable to convey material (e.g., a mined or processed material) from the upstream end 26 to the downstream end 30 at large angles relative to a horizontal 52. Such conveyor assemblies are generally referred to in the art as "high angle conveyors."

With reference to FIG. 1, the frame 14 further includes a plurality of support members (idler roller assemblies 54) that each extend from the first lateral side 34 of the frame 14 to the second lateral side 38 of the frame 14. The idler roller assemblies 54 extend from the bottom side 46 of the frame 14 and support the first conveyor belt 18. The idler roller assemblies 54 are substantially equally spaced apart from one another in the material flow direction 50 extending from the upstream end 26 of the frame 14 to the downstream end 30 of the frame. Additionally, each of the idler roller assemblies 54 includes a plurality of rollers (e.g., idler rollers 58). In the illustrated embodiment, each idler roller assembly 54 includes three idler rollers 58. In alternative embodiments, the number of idler rollers 58 is within a range of one to six. The idler rollers 58 form a U-shaped support surface 60 with each idler roller 58 oriented with respect to an adjacent idler roller by an obtuse angle (FIG. 3).

Figure 3:
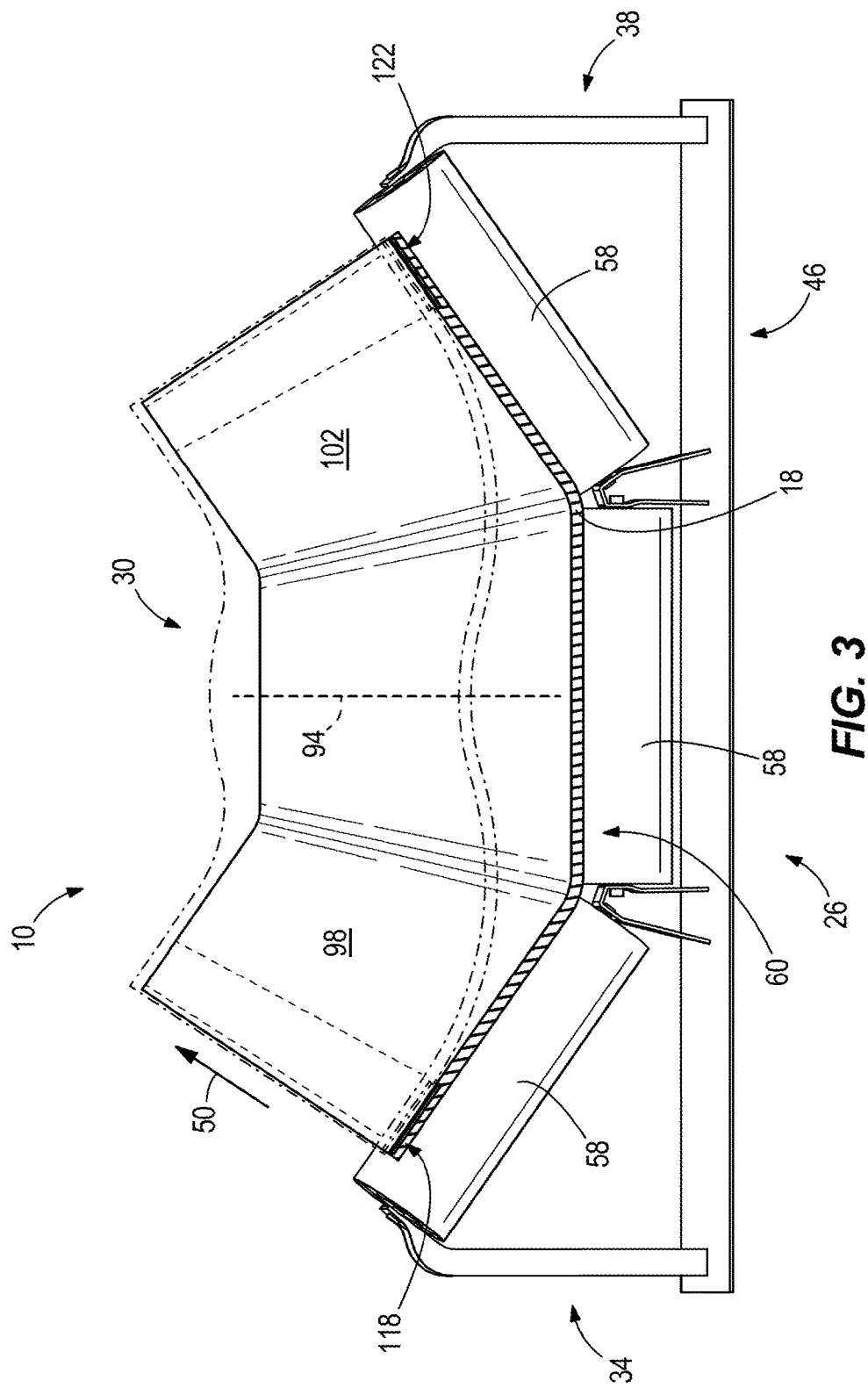
FIG. 3 is a front perspective view of the conveyor assembly of FIG. 1 with components removed to show clarity.

With reference to FIGS. 1-3, the first conveyor belt 18 is coupled to the bottom side 46 of the frame 14 around a first integrated tailpiece 62 and a first integrated headpiece 66. The first integrated tailpiece 62 couples the first conveyor belt 18 to the bottom side 46 of the frame 14 on the upstream end 26 and the first integrated headpiece 66 couples the first conveyor belt 18 to the bottom side 42 of the frame 14 on the downstream end 30. Both the first integrated tailpiece 62 and the first integrated headpiece 66 support the first conveyor belt 18 and are operable to move the first conveyor belt 18 in the material flow direction 50. With continued reference to FIGS. 1 and 2, the second conveyor belt 22 is similar to the first conveyor belt 18. Specifically, the second conveyor belt 22 is coupled to the top side 42 of the frame 14 and includes a second integrated tailpiece 70 and a second integrated headpiece 74. The second integrated tailpiece 70 couples the second conveyor belt 22 to the top side 42 of the frame 14 on the upstream end 26 and the second integrated headpiece 74 couples the second conveyor belt 22 to the top side 42 of the frame 14 on the downstream end 30.

Both the second integrated tailpiece 70 and the second integrated headpiece 74 support the second conveyor belt 22 and are operable to move the second conveyor 22 in the material flow direction 50.

With continued reference to FIG. 2, the first conveyor belt 18 defines a first continuous loop 78. In other words, the first conveyor belt 18 forms a continuous loop from the first integrated tailpiece 62, over the idler roller assemblies 54, around the first integrated headpiece 66, along the bottom side 46 of the frame 14, and back to the first integrated tailpiece 62. As such, the first conveyor belt 18 travels in a continuous path defined by the first continuous loop 78 during operation (e.g., a continuous conveyor system). Additionally, the first continuous loop 78 defines an outer circumference 82 of the first conveyor belt 18. Similarly, the second conveyor belt 22 defines a second continuous loop 86. In other words, the second conveyor belt 22 forms a continuous loop from the second integrated tailpiece 70, extending to the second integrated headpiece 74, around the second integrated headpiece 74, along the top side 42 of the frame 14, and back to the second integrated tailpiece 70. As such, the second conveyor belt 22 travels in a continuous path defined by the second continuous loop 86 during operation (i.e., a continuous conveyor system). Additionally, the second continuous loop 86 defines an outer circumference 90 of the second conveyor belt 22.

With reference to FIG. 3, a centerline 94 is defined on the first conveyor belt 18 substantially in the center of the first conveyor belt 18 and extends parallel to the material flow direction 50 between the upstream end 26 and the downstream end 30 of the frame 14. The centerline 94 divides the first conveyor belt 18 into two substantially equal portions with a first portion 98 spaced laterally from the centerline 94 and a second portion 102 spaced laterally from the centerline 94, opposite the first portion 98. Both the first and second portions 98, 102 extend along the material flow direction 50 (i.e., along the conveying direction) to form at least a portion of the first continuous loop 78.

With reference to FIGS. 1, 4, and 5, the conveyor assembly 10 includes a first magnetic element 118 and a second magnetic element 122 coupled to the first conveyor belt 18. During operation, the first magnetic element 118 and the second magnetic element 122 travel with the first conveyor belt 18 in the conveying direction 50. Specifically, in the illustrated embodiment, the first and second magnetic elements 118, 122 are embedded within the first conveyor belt 18. The first magnetic element 118 is positioned laterally from the centerline 94 on the first portion 98 and the second magnetic element 122 is positioned opposite the first magnetic element 118 on the second portion 102.

With continued reference to FIGS. 4 and 5, the first magnetic element 118 and the second magnetic element 122 are permanent magnets. In particular, the conveyor assembly 10 includes a first plurality of permanent magnets 126 (i.e., a plurality of first magnetic elements 118). In alternative embodiments, the first magnetic element 118 may be a single uniform permanent magnet that extends around the entire continuous loop 78. In further alternatives, one or more of the magnetic elements are ferromagnetic elements that magnetically couple to a magnetic field created by a corresponding permanent magnet, for example.

With reference to FIG. 5, the first conveyor belt 18 and the second conveyor belt 22 each include a top cover 106 and a bottom cover 110 coupled to the top cover 106. Additionally, the first conveyor belt 18 and the second conveyor belt 22 include a first edge 111 and a second edge 112, opposite the first edge 111. In the illustrated embodiment, the first plurality of permanent magnetic elements 126 are embedded within a mesh media 130 on the first portion 98 of the first conveyor belt 18. Likewise, the conveyor assembly 10 includes a second plurality of permanent magnets 134 (i.e., a plurality of second magnetic elements 122) embedded within a mesh media 130 on the second portion 102 of the first conveyor belt 18. In other words, the plurality of first magnetic elements 126 are positioned between the first edge 111 and the centerline 94, and the plurality of second magnetic elements 134 are positioned between the second edge 112 and the centerline 94.

With continued reference to FIG. 4, in the illustrated embodiment, the plurality of permanent magnets 126, 134 are embedded within the mesh media 130 in a diamond-shaped grid pattern (i.e., offset columns). The offset columns alternate between positive columns 138 with positively charged magnets and negative columns 142 with negatively charged magnets. As such, the first and second magnetic elements 118, 122 are configured to magnetically couple to either a ferromagnetic material or another permanent magnet of opposite polarity. The offset columns 138, 142 of positively and negatively charged magnets within the mesh media 130 ensure that a strong magnetic seal is formed, as described in greater detail below. Additionally, the mesh media 130 extends the entire first continuous loop 78 of the first conveyor belt 18. In some embodiments, the mesh material containing the offset columns of magnets 138, 142 can be embedded in the first conveyor belt 18, between the top and bottom covers 106, 110.

With continued reference to FIGS. 1 and 3-5, the conveyor assembly 10 includes a third magnetic element 146 and a fourth magnetic element 150 coupled to the second conveyor belt 22 in much the same way as the first and second magnetic elements 118, 122 are coupled to the first conveyor belt 18. The third and fourth magnetic elements 146, 150 of the second conveyor belt 22 are positioned opposite each other and both include a magnetic mesh media 130 and a plurality of offset columns of magnets 138, 142. In some embodiments, the magnetic mesh media 130 is embedded in the second conveyor belt 22 between the top and bottom covers 106, 110.

The third magnetic element 146 of the second conveyor belt 22 magnetically couples to the first magnetic element 118 of the first conveyor belt 18 to form a first magnetic coupling 114 (i.e., a first magnetic latch). Likewise, the fourth magnetic element 150 of the second conveyor belt 22 magnetically couples to the second magnetic element 122 of the first conveyor belt 18 to form a second magnetic coupling 116 (i.e., a second magnetic latch). As such, with reference to FIG. 1, two magnetic couplings 114, 116 are formed between the first conveyor belt 18 and the second conveyor belt 22. For example, the positively charged magnets 138 from the first conveyor belt 18 magnetically attract the negatively charged magnets from the second conveyor belt 22. Likewise, the negatively charged magnets 142 from the first conveyor belt 18 magnetically attract the positively charged magnets from the second conveyor belt 22. The attraction of the magnets 118, 122, 146, and 150 form strong magnetic couplings 114, 116 between the first and second conveyor belts 18, 22.

In operation, a motor (not shown) turns the first tailpiece 62 and/or the first headpiece 66 of the first conveyor belt 18 and the second tailpiece 70 and/or the second headpiece 74 of the second conveyor belt 22. The first conveyor belt 18 travels along the continuous path of the first circumference 82 defined by the first continuous loop 78. The second conveyor belt 22 travels along the continuous path of the second circumference 90 defined by the second continuous loop 86. As the first conveyor belt 18 travels, it passes over the idler roller assemblies 54 in the material flow direction 50 from the upstream end 26 of the frame 14 to the downstream end 30 of the frame 14. Once the first conveyor belt 18 reaches the downstream end 30 of the frame 14, it passes over the first integrated headpiece 66 to the bottom side 46 of the frame 14 and begins to return to the upstream end 26 of the frame 14. When the first conveyor belt 18 reaches the downstream end 30 of the frame 14, it passes over the first integrated tailpiece 62 and begins another cycle on the first continuous loop 78. At the same time, the second conveyor belt 22 travels over the second integrated tailpiece 70 and heads to the second integrated headpiece 74 in the material flow direction 50. The second conveyor belt 22 then passes over the second integrated headpiece 74 to the top side 42 of the frame 14 and heads back to the second integrated tailpiece 70 at the upstream end 26 of the frame 14. Once the second conveyor belt 22 reaches the upstream end 26 of the frame 14, it passes over the second integrated tailpiece 70 and begins another cycle on the second continuous loop 86.

The mined or processed material M is received from a source (e.g., another conveyor system, crusher, sizer, hopper, silo, load-haul-dump vehicle, etc.) onto the first conveyor belt 18 to be conveyed from the upstream end 26 of the frame 14 to the downstream end 30 of the frame 14 in the material flow direction 50. As the material M is received on the first conveyor belt 18, the second conveyor belt 22 abuts against the first conveyor belt 18 to partially overlap it. For the purposes of the description herein, partially overlaps mean that any portion of the second conveyor belt 22 covers any portion of the first conveyor belt 18 along the material conveying direction 50. The second conveyor belt 22 covers the material M on the first conveyor belt 18 forming a cavity 154 therebetween, where the material M is contained. As such, the first magnetic coupling 114 is formed by the first magnetic element 118 of the first conveyor belt 18 magnetically couples to the third magnetic element 146 of the second conveyor belt 22 to couple the first conveyor belt 18 to the second conveyor belt 22. Additionally, the second magnetic coupling 116 is formed by the second magnetic element 122 of the first conveyor belt 18 coupling with the fourth magnetic element 150 of the second conveyor belt 22. The magnetic couplings 114, 116 seal the mined material M in the cavity 154 formed between the first and second conveyor belts 18, 22 to prevent the mined material M form mitigating off the first conveyor belt 18. In other words, the magnetic coupling 114 magnetically seals the first edges 111 of the first and second conveyor belts 18, 22 (via the magnetic elements 118, 146) and magnetically seals the second edges 112 of the first and second conveyor belts (via the magnetic elements 122, 150).

The conveyor assembly 10 with the magnetic couplings 114, 116 advantageously minimizes the amount of mitigation the mined material experiences when being conveyed. Mitigation of the mined material can lead to some of the mined material escaping laterally from the conveyor assembly 10. The mined material that escapes is considered lost and cannot be used in industry. By providing the magnetic couplings 114, 116 that couple the first conveyor belt 18 to the second conveyor belt 22 to secure the mined material within the cavity 154, the amount of lost mined material is reduced. In addition, the magnetic couplings 114, 116 that seal and hold the mined material in place advantageously allows the mined material to travel at high angles relative to the horizontal 52 without any loss of the mined material. The conveyor assembly with the magnetic couplings 114, 116 formed between the first conveyor belt 18 and the second conveyor belt 22 can be utilized without a mechanical pressing unit. Traditional mechanical pressing units apply mechanical pressure that maintains contact between two conveyor belts. In other words, the magnetic edge belting can be used with or without belt conveyors utilizing pressing units or with or without belt conveyors that incorporate the use of radial pressure produced by the inherent belt tension on a curve profile.

With reference to FIG. 6, a conveyor assembly 610 is illustrated according to another embodiment of the invention. The conveyor assembly 610 differs from the conveyor assembly 10 in that the conveyor assembly 610 does not include the second conveyor belt 22, but instead magnetically couples to itself to form a cavity 614 in which mined material M can be conveyed in. The conveyor assembly 610 includes a frame 618 and a conveyor belt 622. In some embodiments, the conveyor belt 622 is identical to the first conveyor belt 18. The frame 618 supports the conveyor belt 622 while it moves in a material flow direction 626 defined as the conveying direction (e.g., into the page as viewed from FIG. 6). The conveyor belt 622 defines a centerline 630 extending in the conveying direction 626. The centerline 630 is substantially in the center of the conveyor belt 622 and divides the conveyor belt 622 into two substantially equal portions with a first portion 634 being spaced laterally from the centerline 630 and a second portion 638 spaced laterally from the centerline 630, opposite the first portion 634 when unfurled.

With reference to FIG. 6, the first portion 634 is folded onto the second portion 638 about the centerline 630 to overlap the first portion 634. Further, the conveyor assembly 610 includes a magnetic coupling 642 including a first magnetic element 646 coupled to the conveyor belt 622 and spaced laterally from the centerline 630 on the first portion 634, and a second magnetic element 650 spaced laterally from the centerline 630 on the second portion 638. The magnetic coupling 642 couples the first portion 634 to the second portion 638. Both the first and second magnetic elements 646, 650 are configured to move with the conveyor belt 622 in the conveying direction 626.

With continued reference to FIG. 6, the magnetic coupling 642 is formed when the first magnetic element 646 and the second magnetic element 650 are proximate each other such that there are attractive magnetic forces acting on the first and second magnetic elements 646, 650. With the first and second portions 634, 638 of the conveyor belt 622 magnetically coupled together, the conveyor belt 622 forms the cavity 614 in a tear drop shape. In other words, when the conveyor belt 622 is folded about the centerline 630, allowing the first and second magnetic elements 646, 650 to form the magnetic coupling 642, the tear drop shaped cavity 614 is formed. The mined material M is then conveyed within the cavity 614 and the magnetic coupling 642 ensures there is no mitigation of the mined material M out of the cavity 614 while the conveyor belt 622 is moving. In alternative embodiments, the tear drop shaped cavity 614 can be oriented vertically such that the magnetic coupling is formed directly above the centerline 630.

Figure 7:
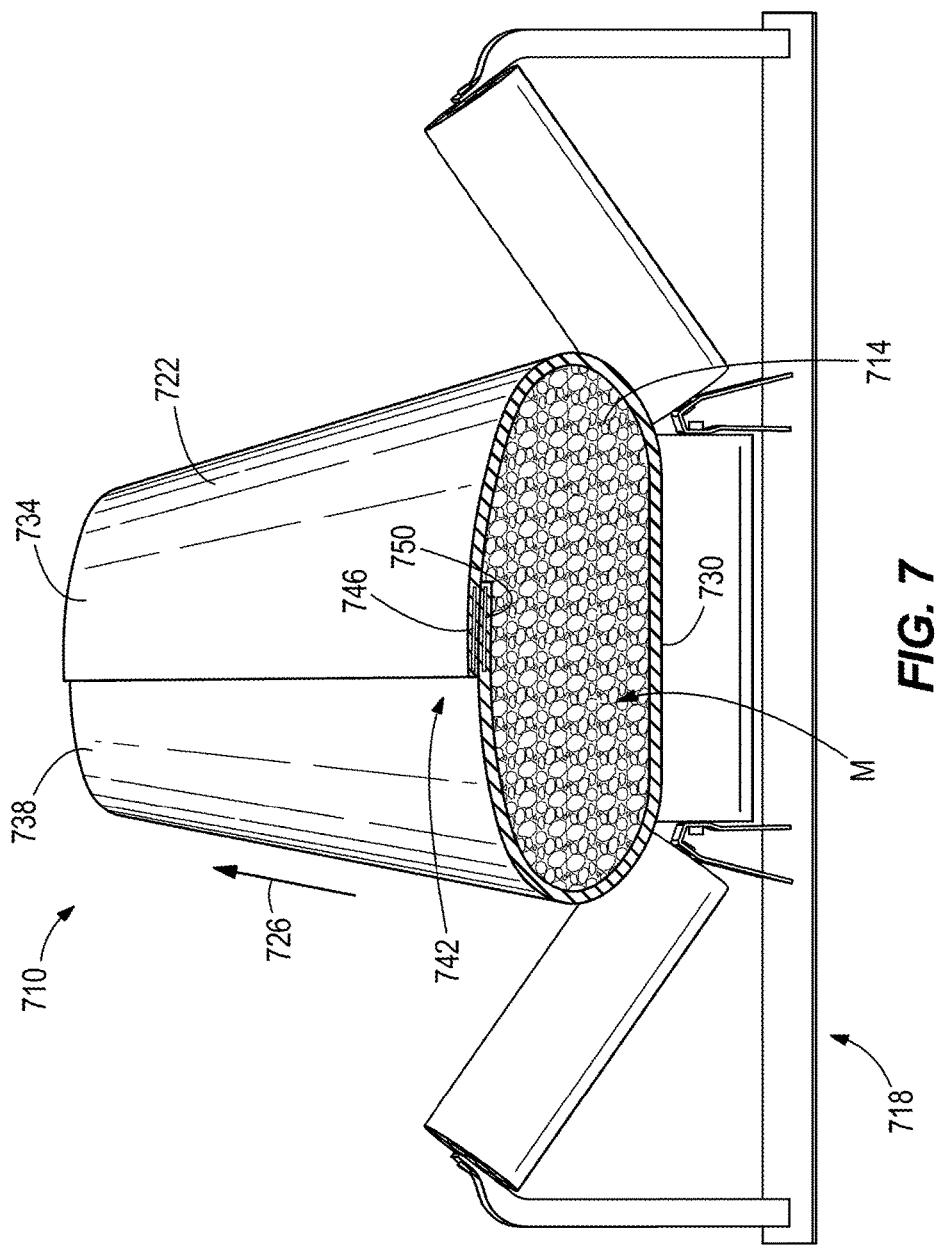
FIG. 7 is a front cross sectional view of a conveyor assembly according to another embodiment of the invention.

With reference to FIG. 7, a conveyor assembly 710 is illustrated according to another embodiment of the invention. The conveyor assembly 710 is similar to the conveyor assembly 610 but differs in that conveyor assembly 710 is rolled over itself to magnetically couple and form a cavity 714 in which mined material M can be conveyed in. The conveyor assembly 710 includes a frame 718 and a conveyor belt 722. In some embodiments, the conveyor belt 722 is identical to the first conveyor belt 18. The frame 718 supports the conveyor belt 722 while it moves in a material flow direction 726 defined as the conveying direction (e.g., into the page as viewed from FIG. 7). The conveyor belt 722 defines a centerline 730 extending in the conveying direction 726. The centerline 730 is substantially in the center of the conveyor belt 722 and divides the conveyor belt 722 into two substantially equal portions with a first portion 734 being spaced laterally from the centerline 730 and a second portion 738 spaced laterally from the centerline 730, opposite the first portion 734 when unrolled.

With reference to FIG. 7, the conveyor assembly 710 includes a magnetic coupling 742 including a first magnetic element 746 coupled to the conveyor belt 722 and spaced laterally from the centerline 730 on the first portion 734, and a second magnetic element 750 spaced laterally from the centerline 730 on the second portion 738. In the illustrated embodiment, the magnetic coupling 742 is positioned over the centerline 730. In other embodiments the magnetic coupling may be positioned beneath the centerline 730.

With continued reference to FIG. 7, the magnetic coupling 742 is formed when the first magnetic element 746 and the second magnetic element 750 are proximate each other such that there are attractive magnetic forces acting on the first and second magnetic elements 746, 750. With the first and second portions 734, 738 of the conveyor belt 722 magnetically coupled together, the conveyor belt 722 forms the cavity 714. In other words, to form the cavity 714 mined material is placed on the conveyor belt 722 and then the first portion 734 is rolled counterclockwise while the second portion 738 is rolled clockwise until the first magnetic element 746 overlaps the second magnetic element 750 allowing the first and second magnetic elements 746, 750 to form the magnetic coupling 742. The mined material M is then conveyed within the cavity 714 and the magnetic coupling 742 ensures there is no mitigation of the mined material M out of the cavity 714 while the conveyor belt 722 is moving.

Various features and advantages of the invention are set forth in the following claims.

What is claimed is:

1. A conveyor assembly comprising:
   a first conveyor belt that defines a centerline extending in a conveying direction;
   a second conveyor belt that at least partially overlaps the first conveyor belt in the conveying direction; and
   a magnetic coupling that magnetically couples the first conveyor belt to the second conveyor belt.

2. The conveyor assembly of claim 1, wherein the magnetic coupling includes a first magnetic element coupled to the first conveyor belt and a second magnetic element coupled to the second conveyor belt, and wherein the first magnetic element is magnetically coupled to the second magnetic element.

3. The conveyor assembly of claim 2, wherein the first magnetic element includes at least one permanent magnet and the second magnetic element includes at least one permanent magnet.

4. The conveyor assembly of claim 2, wherein the first magnetic element includes at least one permanent magnet and the second magnetic element includes a ferromagnetic element.

5. The conveyor assembly of claim 2, wherein the first magnetic element is embedded in the first conveyor belt and the second magnetic element is embedded in the second conveyor belt.

6. The conveyor assembly of claim 2, wherein the magnetic coupling is a first magnetic coupling and the conveyor assembly further includes a second magnetic coupling including a third magnetic element coupled to the first conveyor belt and a fourth magnetic element coupled to the second conveyor belt.

7. The conveyor assembly of claim 1, wherein the first conveyor belt defines a first continuous loop and the second conveyor belt defines a second continuous loop.

8. The conveyor assembly of claim 7, wherein the first continuous loop defines a first circumference and the second continuous loop defines a second circumference, and wherein the first magnetic element extends along the entire first circumference and the second magnetic element extends along the entire second circumference.

9. The conveyor belt of claim 1, wherein a cavity is formed between the first conveyor belt and the second conveyor belt when material is conveyed.

10. A conveyor assembly comprising:
    a conveyor belt that defines a centerline extending in a conveying direction, the conveyor belt operable to move in the conveying direction; wherein the conveyor belt forms a continuous loop that defines a first circumference; and
    a magnetic element coupled to the conveyor belt and spaced laterally from the centerline;
    wherein the magnetic element travels with the conveyor belt in the conveying direction;
    and wherein the magnetic element extends along the entire first circumference.

11. The conveyor assembly of claim 10, wherein the magnetic element is a first magnetic element and the conveyer assembly further comprises a second magnetic element coupled to the conveyor belt spaced laterally from the centerline.

12. The conveyor assembly of claim 11, wherein the first magnetic element and the second magnetic element are configured to magnetically couple together.

13. The conveyor assembly of claim 12, wherein the first magnetic element and the second magnetic element are embedded in the conveyor belt.

14. The conveyor assembly of claim 10, wherein the conveyor belt is a first conveyor belt, and the conveyor assembly further comprises a second conveyor belt that at least partially overlaps the first conveyor belt in the conveying direction.

15. The conveyor assembly of claim 14, further comprising a second magnetic element coupled to the second conveyor belt and spaced laterally from the centerline.

16. The conveyor assembly of claim 15, wherein the first magnetic element and the second magnetic element couple the first conveyor to the second conveyor.

17. The conveyor assembly of claim 10, wherein the conveyor belt at least partially defines a cavity when material is conveyed.

18. The conveyor assembly of claim 17, wherein the cavity is of a tear drop shape.

* * * * *